United States Patent
Brückner et al.

(10) Patent No.: US 10,100,680 B2
(45) Date of Patent: Oct. 16, 2018

(54) COMBINED CYCLE GAS TURBINE PLANT COMPRISING A WASTE HEAT STEAM GENERATOR AND FUEL PREHEATING STEP

(71) Applicant: Siemens Aktiengesellschaft, Munich (DE)

(72) Inventors: Jan Brückner, Uttenreuth (DE); Frank Thomas, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/021,530

(22) PCT Filed: Aug. 21, 2014

(86) PCT No.: PCT/EP2014/067830
§ 371 (c)(1),
(2) Date: Mar. 11, 2016

(87) PCT Pub. No.: WO2015/039831
PCT Pub. Date: Mar. 26, 2015

(65) Prior Publication Data
US 2016/0230606 A1    Aug. 11, 2016

(30) Foreign Application Priority Data

Sep. 19, 2013 (DE) .................. 10 2013 218 809

(51) Int. Cl.
*F01K 23/10* (2006.01)
*F22B 1/18* (2006.01)
(Continued)

(52) U.S. Cl.
CPC .............. *F01K 23/10* (2013.01); *F01K 23/106* (2013.01); *F02C 7/224* (2013.01); *F22B 1/1815* (2013.01);
(Continued)

(58) Field of Classification Search
CPC ........ F01K 23/10; F01K 23/106; F02C 7/224; F02C 6/18; Y02E 20/16
See application file for complete search history.

(56) References Cited

U.S. PATENT DOCUMENTS 4,932,204 A    6/1990  Pavel et al.
5,293,842 A    3/1994  Loesel
(Continued)

FOREIGN PATENT DOCUMENTS

CN    102140965 A    8/2011
CN    103016157 A    4/2013
(Continued)

OTHER PUBLICATIONS

CNOA dated Aug. 15, 2016, for CN patent application No. 201480051801.9.
(Continued)

*Primary Examiner* — William H Rodriguez
*Assistant Examiner* — William Breazeal
(74) *Attorney, Agent, or Firm* — Beusse Wolter Sanks & Maire

(57) ABSTRACT

A combined cycle gas turbine plant and a corresponding method for operating such a combined cycle gas turbine plant, in which, during load operation of the combined cycle gas turbine plant, a water mass flow which is supplied according to the forced-flow principle to a waste heat steam generator is adjusted such that the evaporator heating surface of the medium pressure stage is oversupplied and thus a defined amount of excess water, which is heated in the evaporator heating surface but not vaporized, is discharged via the water-steam separator to a heat exchanger circuit for preheating fuel for the gas turbine.

5 Claims, 2 Drawing Sheets

(51) Int. Cl.
*F22B 29/06* (2006.01)
*F02C 7/224* (2006.01)

(52) U.S. Cl.
CPC ............ *F22B 29/06* (2013.01); *F22B 29/068* (2013.01); *Y02E 20/16* (2013.01); *Y02P 80/154* (2015.11)

(56) References Cited

U.S. PATENT DOCUMENTS

| | | | |
|---|---|---|---|
| 5,588,400 | A | 12/1996 | Stefan et al. |
| 5,924,389 | A * | 7/1999 | Palkes ................... F22B 1/1815 122/1 B |
| 6,041,588 | A | 3/2000 | Brueckner et al. |
| 6,101,982 | A | 8/2000 | Fischer et al. |
| 6,145,295 | A | 11/2000 | Donovan et al. |
| 6,173,679 | B1 | 1/2001 | Brueckner et al. |
| 6,269,626 | B1 * | 8/2001 | Kim .................... F01K 23/106 122/7 B |
| 9,746,174 | B2 * | 8/2017 | Wilhelm ................. F22B 29/06 |
| 2004/0011019 | A1 | 1/2004 | Schmid et al. |
| 2009/0090111 | A1 | 4/2009 | Tomlinson et al. |
| 2010/0175366 | A1 * | 7/2010 | Nattanmai ............. F01K 13/02 60/39.182 |
| 2011/0185702 | A1 | 8/2011 | Bilton et al. |
| 2011/0247335 | A1 | 10/2011 | Schmid et al. |
| 2012/0317988 | A1 | 12/2012 | Gardiner et al. |
| 2013/0074508 | A1 | 3/2013 | Sholes et al. |
| 2013/0160424 | A1 * | 6/2013 | Broesamle .............. F02C 7/185 60/39.182 |
| 2013/0186089 | A1 | 7/2013 | Brueckner et al. |

FOREIGN PATENT DOCUMENTS

| | | | | |
|---|---|---|---|---|
| CN | 103189603 | A | | 7/2013 |
| DE | 4303613 | A1 | | 8/1994 |
| DE | 4321081 | A1 | | 1/1995 |
| DE | 19512466 | C1 | | 8/1996 |
| EP | 0561220 | A1 | | 9/1993 |
| EP | 0918151 | A1 | | 5/1999 |
| EP | 0919707 | A1 | | 6/1999 |
| EP | 0931911 | A2 | | 7/1999 |
| EP | 1199445 | A1 | | 4/2002 |
| EP | 2199547 | A1 | | 6/2010 |
| EP | 2426337 | A1 | | 3/2012 |
| EP | 2824293 | | * 8/2013 | ............ F01K 23/10 |
| JP | H11200816 | A | | 7/1999 |
| JP | 2009092372 | A | | 4/2009 |
| JP | 2012184735 | A | | 9/2012 |
| WO | 9500747 | A1 | | 1/1995 |
| WO | 9901697 | A1 | | 1/1999 |

OTHER PUBLICATIONS

JP Office Action dated Apr. 10, 2017, for4 JP patent application No. 2016-515543.

Hartlieb N. et al.: "Auslegungskriterien für die Dampferzeuger der KoBra-Demoanlage der RWE Engergie AG"; BWK Brennstoff Warme Kraft; Springer VDI Verlag; Düsseldorf; DE; Bd. 45, Nr. 7 / 08, Jul. 1, 1993 (Jul. 1, 1993); pp. 332-336; XP000384633; ISSN: 1618-193X; Abbildungen 2,3; 1993.

* cited by examiner

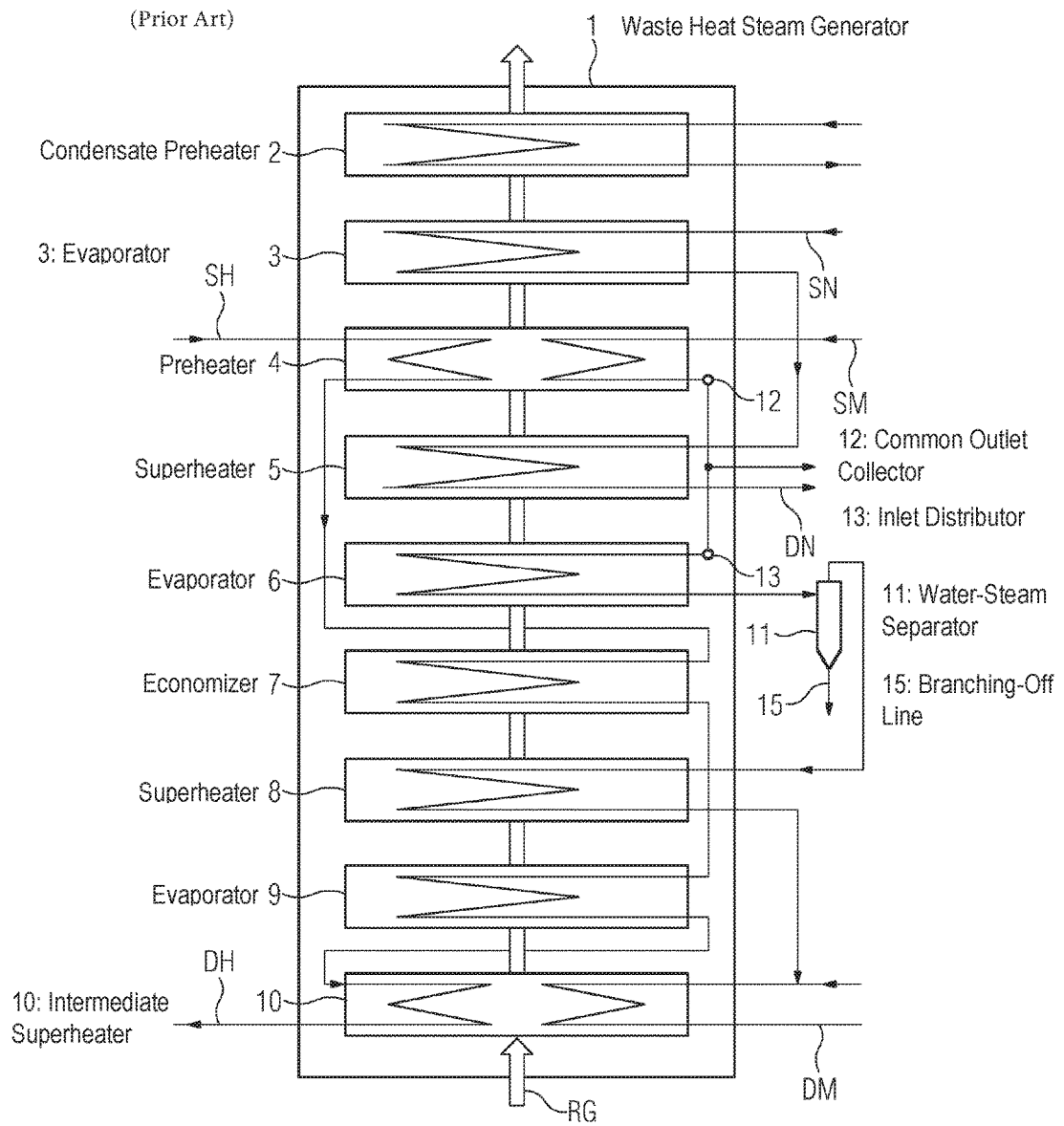

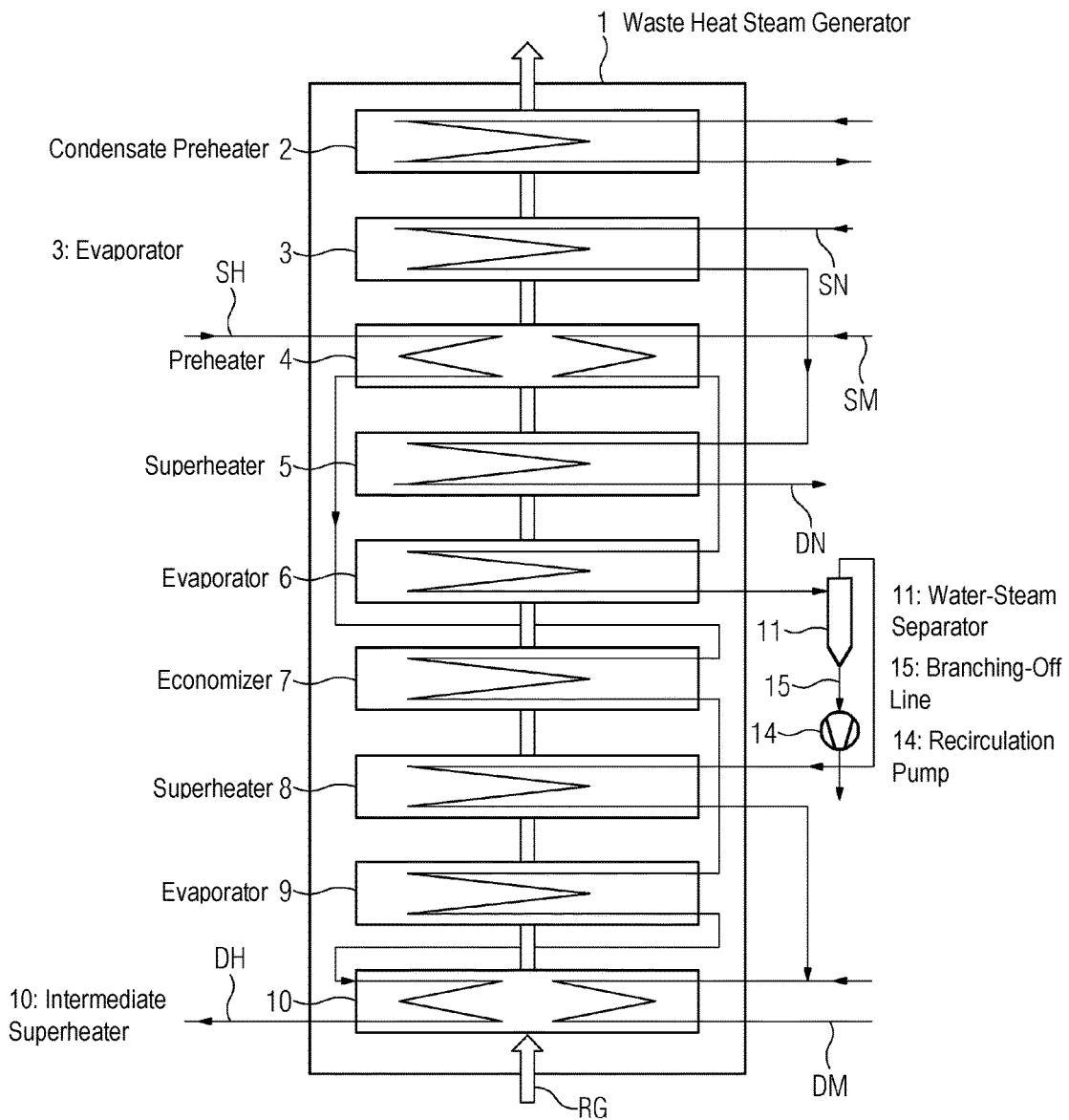

COMBINED CYCLE GAS TURBINE PLANT COMPRISING A WASTE HEAT STEAM GENERATOR AND FUEL PREHEATING STEP

CROSS REFERENCE TO RELATED APPLICATIONS

This application is the US National Stage of International Application No. PCT/EP2014/067830 filed Aug. 21, 2014, and claims the benefit thereof. The International Application claims the benefit of German Application No. DE 102013218809.9 filed Sep. 19, 2013. All of the applications are incorporated by reference herein in their entirety.

FIELD OF INVENTION

The invention relates to a combined cycle power plant having a waste heat steam generator, and to a corresponding method for operating such a combined cycle power plant.

BACKGROUND OF INVENTION

Combined cycle power plants are installations that combine the principles of a gas turbine power plant and of a steam turbine power plant. In the waste heat steam generator, the hot flue gas leaving the gas turbine is used to generate steam for the steam turbine. In that context, the transfer of heat takes place by means of a number of heating surfaces which are arranged in the form of tubes or tube bundles in the waste heat steam generator. These are in turn connected in the water-steam circuit, comprising at least one pressure stage, of the steam turbine. In that context, each pressure stage usually has, as heating surfaces, a preheater or economizer, an evaporator and a superheater.

The configuration of the waste heat steam generator is nowadays governed strictly by economic aspects. In particular, the choice of the process parameters pressure and temperature for the steam generated by the waste heat steam generator and the number of heating surfaces in the waste heat steam generator are nowadays crucial and depend both on the gas turbine outlet temperature and also the boundary conditions for operation of the combined cycle power plant. In that context, one measure for the quality of steam production at each point in the waste heat steam generator is the temperature difference between the flue gas and the steam at that point.

As a consequence of the constantly increasing demands on the economic viability of combined cycle power plants, increasing efforts have already been made hitherto, analogously to fired steam generators, to also introduce waste heat steam generators with supercritical process parameters. Since one finds oneself in this case in a pressure range above the two-phase range, in particular the natural circulation systems with their associated drums can no longer be used for the separation of mixtures, since there is no mixture of the water and steam phases with different densities. Here, the once-through principle can then be used, that is to say a high-pressure pump in the water-steam circuit conveys, in a controlled manner, precisely the right amount of water—also termed feed water—into the waste heat steam generator, such that at the outlet of the latter, in coordination with the predefined gas-side supply of heat, the corresponding quantity of steam—also termed fresh steam—emerges with the required supercritical steam parameters. Such a waste heat steam generator with at least one pressure stage operating according to the once-through principle is known for example from WO 99/01697 A1.

Since a waste heat steam generator operating according to the once-through principle requires no large-volume drums, which require thick walls in order to be strong enough to cope with the system pressure, such a steam generator is characterized by a short start-up time. A critical variable in the context of the configuration of such a waste heat steam generator is, however, still the stable through-flow of the evaporator heating surfaces over the entire load range of the combined cycle power plant.

For the purpose of increasing thermal efficiency, currently known combined cycle power plants usually have fuel preheating. This involves controlled withdrawal, from the water-steam circuit, of part of the feed water heated in the preheater, at a temperature of approximately 220° C.-240° C., at the outlet of the preheater of the intermediate-pressure stage of the waste heat steam generator, which feed water is fed to a heat exchanger circuit for fuel preheating. In that context, a suitable pressure control strategy of the intermediate-pressure stage further ensures, over the entire load range, a sufficient temperature, at this withdrawal point, of the medium circulating in the water-steam circuit.

More recent research into waste heat steam generators designed according to the once-through principle has now shown that stable flow through the evaporator of the intermediate-pressure stage can be achieved, even at the low pressures prevailing there, if the tubing of the preheater and of the evaporator is effected in one pass, that is to say without additional pressure equalization, and in the preheating region of this combined heating surface a sufficiently high pressure drop is generated. This can be ensured by designing the tubes of this heating surface with small internal diameters in the inlet region, in which exclusively subcooled water flows over the entire load range, so as to achieve the throttle pressure drop required for stable flow through the intermediate-pressure evaporator. To that end, however, it is necessary to dispense with the outlet collector at the outlet of the preheater and with the inlet distributor at the subsequent evaporator inlet. However, this does away with the branching-off line, usually provided at this point, for diverting heated water for preheating fuel. In current combined cycle power plants, omitting this fuel preheating is not desirable from the point of view of the operation of the plant as a whole. A consequence of relocating the branching-off line, for the purpose of partially diverting the preheated feed water into a heat exchanger circuit of the fuel preheating, from the outlet of the preheater of the intermediate-pressure stage to the outlet of the preheater of the high-pressure stage would be that the components of the heat exchanger circuit would have to be configured and secured for markedly higher pressures, which would in turn lead to a substantial cost increase. Switching to the low-pressure stage is not possible, since in the low-pressure stage the quantities of heat and temperatures required for the fuel preheating cannot be made available.

SUMMARY OF INVENTION

The invention therefore has an object of identifying a connection scheme for a waste heat steam generator with fuel preheating in a combined cycle power plant, and a corresponding method for operating such a combined cycle power plant, which is suitable for a waste heat steam generator configured according to the once-through principle.

This object is achieved with the combined cycle power plant having the features of the independent claim, and with the method for operating a combined cycle power plant thus designed.

By virtue of the fact that, in a combined cycle power plant having a waste heat steam generator that has a multiplicity of heating surfaces which are arranged in the exhaust gas duct of the gas turbine and are connected to one another to form a three-stage pressure system, consisting of a low-pressure stage, an intermediate-pressure stage and a high-pressure stage for the water-steam circuit of the steam turbine, and each of the pressure stages has in each case at least one heating surface for preheating, for evaporating and for superheating, a water-steam separator, which is arranged between the outlet of the evaporator heating surface and the inlet of the superheater heating surface of the intermediate-pressure stage and in which excess water can be separated from the steam, is provided with a branching-off line for diverting the excess water, and this branching-off line is connected to a heat exchanger circuit for preheating the fuel for the gas turbine such that a defined quantity of excess water separated in the water-steam separator is introduced into the heat exchanger circuit, and during load operation of the combined cycle power plant, a water mass flow fed to the waste heat steam generator is set such that the evaporator heating surface of the intermediate-pressure stage is oversupplied and thus a defined quantity of excess water, heated but not evaporated in the evaporator heating surface, is diverted via the water-steam separator to a heat exchanger circuit for preheating fuel for the gas turbine, it is also possible, in such a circuit, for a both statically and dynamically stable throughflow of the evaporator heating surfaces of the intermediate-pressure stage to be achieved over the entire load range.

Such a combined cycle power plant designed according to the invention can thus be operated effectively both from the point of view of the operation of the plant as a whole and also taking into account economic aspects. Thus, by virtue of the connection scheme according to the invention and the method according to the invention, it is now possible to make effective use both of the advantages of a waste heat steam generator operating according to the once-through principle and of the advantages of fuel preheating. It is thus for example possible to omit the drum which would be necessary for evaporators operating according to the natural circulation principle. The oversupply required for the fuel preheating additionally ensures further stabilization of the evaporator, since the mass flow density increases both in the evaporator and in particular in the economizer heating surface, which generates the pressure drop necessary for flow stabilization. It is thus possible either to broaden the permissible load range of the intermediate-pressure stage, which contributes to an increase in the overall plant flexibility, or, given the same required load range, to reduce the internal diameter—necessary for generating the pressure drop—of the intermediate-pressure economizer heating surface pipes, which results in a saving in terms of materials and thus costs. In addition, in the case of such operation, temperature imbalances of adjacent heating surface tubes and stresses resulting therefrom in the evaporator heating surface cannot moreover be assumed for system-related reasons, since all of the evaporator tubes are at the same boiling temperature level.

As a consequence of the evaporator of the intermediate-pressure stage being oversupplied according to the invention, water constantly accumulates in the downstream water-steam separator. In the water-steam separator, the excess water is separated from the steam. The steam flows on into the superheater of the intermediate-pressure stage, while the separated, heated water is now fed to the fuel preheater. In that context, in load operation of the combined cycle power plant, the evaporator is to be oversupplied, by means of corresponding control of the mass flow of feed water fed to the waste heat steam generator, such that the separated water is sufficient for the fuel preheating. The evaporator through-flow which is to be controlled is thus governed, inter alia, by the quantity of heat required by the fuel preheater.

In the event that no fuel preheating is required, e.g. in oil operation, it is by contrast possible, by means of a corresponding setting of the feed water mass flow, to operate the evaporator of the intermediate-pressure stage with a minimum superheating at the evaporator outlet of for example 10-15 K, such that no additional water accumulates in the water-steam separator, which water would then, if necessary, have to be discharged as waste water. In the case of intermediate-pressure stages having an additionally integrated recirculation pump in the branching-off line of the water-steam separator, it is by contrast possible, in oil operation, also with oversupplied intermediate-pressure evaporator, for the residual water separated in the water-steam separator to be suitably returned to the inlet of the condensate preheater, which would reduce the recirculation quantity of the condensate recirculation, and in these circumstances, as the case may be, a smaller condensate recirculation pump could be used (in oil operation the system requires the greatest condensate recirculation). Further potential cost savings would thus be conceivable also against this backdrop, or the additional financial outlay for the intermediate-pressure recirculation pump would be reduced.

It is thus in principle possible, with the method according to the invention, to react flexibly to different operating states of the combined cycle power plant.

BRIEF DESCRIPTION OF THE DRAWINGS

The invention will now be explained, by way of example, with reference to the following figures. In the figures:

FIG. 1 shows, schematically, a known set-up for a waste heat steam generator,

FIG. 2 shows, schematically, an inventive circuit diagram for a waste heat steam generator.

DETAILED DESCRIPTION OF INVENTION

The waste heat steam generator 1 shown, in upright configuration, is flowed through by hot flue gas RG from the gas turbine. The cooled flue gas RG leaves the waste heat steam generator 1 in the direction of a chimney (not shown in more detail). In the waste heat steam generator, the hot flue gas is used to generate steam for the steam turbine. In that context, the transfer of heat takes place by means of a number of heating surfaces which are arranged in the form of tubes or tube bundles in the waste heat steam generator. These are in turn connected in the water-steam circuit, comprising at least one pressure stage, of the steam turbine. The heating surfaces shown here in the waste heat steam generator form a three-stage pressure system, consisting of a high-pressure stage, an intermediate-pressure stage and a low-pressure stage. In that context, each one of the pressure stages has heating surfaces acting as preheater or economizer, evaporator and superheater, in which feed water from a water-steam circuit, of the steam turbine (not shown in greater detail) of the combined cycle power plant, is in stages heated and evaporated, and this steam can be supplied to the steam turbine. In addition, the waste heat steam generator shown here also has a condensate preheater 2.

Thus, in the intermediate-pressure stage, feed water is supplied in a controlled manner to the preheater 4 via a feed water line SM. On the outlet side, the tubes of the preheater 4 open into a common outlet collector 12 which is connected to an inlet distributor 13 of the evaporator 6 connected downstream of the preheater 4. On the outlet side, the heating surface tubes of the evaporator 6 open, via a steam line, into a water-steam separator 11. The connection of the steam line is provided at the steam-side head end of the water-steam separator 11, to which a further steam line is connected. This steam line opens into the heating surfaces of the superheater 8. In the present example, there is also provided, between the outlet of the superheater 8 and the main steam line DM, an intermediate superheater surface 10. The water-steam separator 11 has, at its water-side bottom end, a branching-off line for diverting the excess water. The heating surfaces 4, 6, 8 and 10 of the intermediate-pressure stage of the waste heat steam generator 1 are thus connected into the water-steam circuit of the steam turbine via the feed water line SM and the main steam line DM, in a manner which is not shown in more detail. The heating surfaces of the low-pressure stage and of the high-pressure stage are connected in a corresponding manner. In the low-pressure stage, feed water flows from a feed water line SN directly into an evaporator 3 and then into a superheater 5, before it leaves the waste heat steam generator 1 as low-pressure steam and is fed into the low-pressure main steam line DN. In the high-pressure stage, feed water from a feed water line SH flows into the preheater 4, thence into a further economizer 7, thence into the evaporator 9 and via the superheater 10 as high-pressure steam back into the high-pressure main steam line DH of the water-steam circuit of the steam turbine. In terms of construction, in the present embodiment the first economizer heating surface tubes of the high-pressure stage and the economizer heating surface tubes of the intermediate-pressure stage are conflated to a common heating surface 4, and also the superheater heating surface tubes of the high-pressure stage are conflated with the heating surface tubes of an intermediate superheater stage of the intermediate-pressure stage to a common heating surface 10.

FIG. 2 now shows an embodiment of the inventive connection scheme for the heating surfaces of the intermediate-pressure stage for a waste heat steam generator 1 operating according to the once-through principle. The connection scheme for the heating surfaces of the low-pressure and high-pressure stages remains unchanged. For the intermediate-pressure stage, both the separate outlet collector at the outlet of the intermediate-pressure economizer heating surface 4 and the separate inlet collector of the intermediate-pressure evaporator heating surface 6 are omitted. In these circumstances, the tubes of the intermediate-pressure economizer heating surface 4 transition directly, with no physical separation, into those of the intermediate-pressure evaporator heating surface 6. This way of connecting the intermediate-pressure economizer and the intermediate-pressure evaporator has substantial advantages for ensuring both the static and dynamic flow stability of the evaporator, since the pressure drop of the subcooled inlet medium, which is necessary for generating the evaporator stability, can be generated by means of suitable measures already in the intermediate-pressure economizer heating surface 4 with no noteworthy drawbacks. Taking into account this type of connection scheme, thus in the case of the intermediate-pressure stage, the branching-off line for diverting heated water to a heat exchanger circuit for fuel preheating for the gas turbine is not provided between 12 and 13 as shown in FIG. 1, but is provided at the water-steam separator 11. According to the invention, it is thus possible, during load operation of the combined cycle power plant, for a water mass flow fed to the waste heat steam generator to be set such that the evaporator heating surface 6 of the intermediate-pressure stage is oversupplied and thus a defined quantity of excess water, heated but not evaporated in the evaporator heating surface 6, is diverted via the water-steam separator 11 and the branching-off line to a heat exchanger circuit for preheating fuel for the gas turbine. In the present exemplary embodiment, there is arranged in the branching-off line 15 a recirculation pump 14 for support in case the pressure ratios in the heat exchanger circuit for the fuel preheating make this necessary. By virtue of the fact that, in these circumstances, use can be made for the intermediate-pressure stage of an evaporator connection that has no physical separation, such as by additional collectors or distributors, between the economizer heating surface and the evaporator heating surface and thus contains the economizer, the flow medium always has sufficient subcooling at the heating surface inlet over the entire load range. An economizer bypass connection can, in these circumstances, also be omitted, which implies a further potential cost saving.

The invention claimed is:

1. A combined cycle power plant comprising:
a waste heat steam generator comprising a multiplicity of heating surfaces which are:
arranged in an exhaust gas duct of a gas turbine; and
wherein the multiplicity of heating surfaces are connected to one another to form a three-stage pressure system, the waste heat steam generator comprising a low-pressure stage, an intermediate-pressure stage and a high-pressure stage for a water-steam circuit of a steam turbine,
wherein each of the low-pressure stage, intermediate-pressure stage and high-pressure stage comprises respectively at least one heating surface for preheating, for evaporating, and for superheating,
wherein the intermediate-pressure stage is configured to operate on a once-through principle in which an intermediate-pressure evaporator generates steam in a single pass therethrough and without a steam drum,
wherein a water-steam separator, which is arranged between an outlet of an evaporator heating surface of the intermediate-pressure evaporator and an inlet of a superheater heating surface of a superheater of the intermediate-pressure stage and in which excess water can be separated from the steam, is provided with a branching-off line for diverting the excess water,
wherein the branching-off line is connected to a heat exchanger circuit for preheating fuel for the gas turbine such that a defined quantity of excess water separated in the water-steam separator is introduced into the heat exchanger circuit, and
wherein during load operation the combined cycle power plant is configured to feed a water mass flow to the waste heat steam generator such that the evaporator heating surface of the intermediate-pressure stage is oversupplied and thus the defined quantity of excess water, which is heated but not evaporated in the evaporator heating surface, is diverted via the water-steam separator to the heat exchanger circuit for preheating the fuel for the gas turbine.

2. The combined cycle power plant as claimed in claim 1, wherein the branching-off line comprises a recirculation pump.

3. The combined cycle power plant as claimed in claim 1, wherein tubes of an intermediate pressure economizer transition directly, with no physical separation, into tubes of the intermediate-pressure evaporator.

4. A method for operating a combined cycle power plant comprising a waste heat steam generator comprising a multiplicity of heating surfaces which are: arranged in an exhaust gas duct of a gas turbine; and
   wherein the multiplicity of heating surfaces are connected to one another to form a three-stage pressure system, the waste heat steam generator comprising a low-pressure stage, an intermediate-pressure stage and a high-pressure stage for a water-steam circuit of a steam turbine,
   wherein each of the low-pressure stage, intermediate-pressure stage and high-pressure stage comprises respectively at least one heating surface for preheating, for evaporating, and for superheating, wherein the intermediate-pressure stage is configured to operate on a once-through principle in which an intermediate-pressure evaporator generates steam in a single pass therethrough and without a steam drum, wherein a water-steam separator, which is arranged between an outlet of an evaporator heating surface of the intermediate-pressure evaporator and an inlet of a superheater heating surface of a superheater of the intermediate-pressure stage and in which excess water can be separated from the steam, is provided with a branching-off line for diverting the excess water, wherein the branching-off line is connected to a heat exchanger circuit for preheating fuel for the gas turbine such that a defined quantity of excess water separated in the water-steam separator is introduced into the heat exchanger circuit, the method comprising:
   during load operation of the combined cycle power plant, feeding a water mass flow to the waste heat steam generator such that the evaporator heating surface of the intermediate-pressure stage is oversupplied and thus the defined quantity of excess water, which is heated but not evaporated in the evaporator heating surface, is diverted via the water-steam separator to the heat exchanger circuit for preheating the fuel for the gas turbine.

5. The method as claimed in claim 4, wherein a feedwater flow rate is controlled to control the water mass flow, the method further comprising controlling the feedwater flow rate to ensure the defined quantity of excess water is sufficient for preheating the fuel.

* * * * *